UNITED STATES PATENT OFFICE.

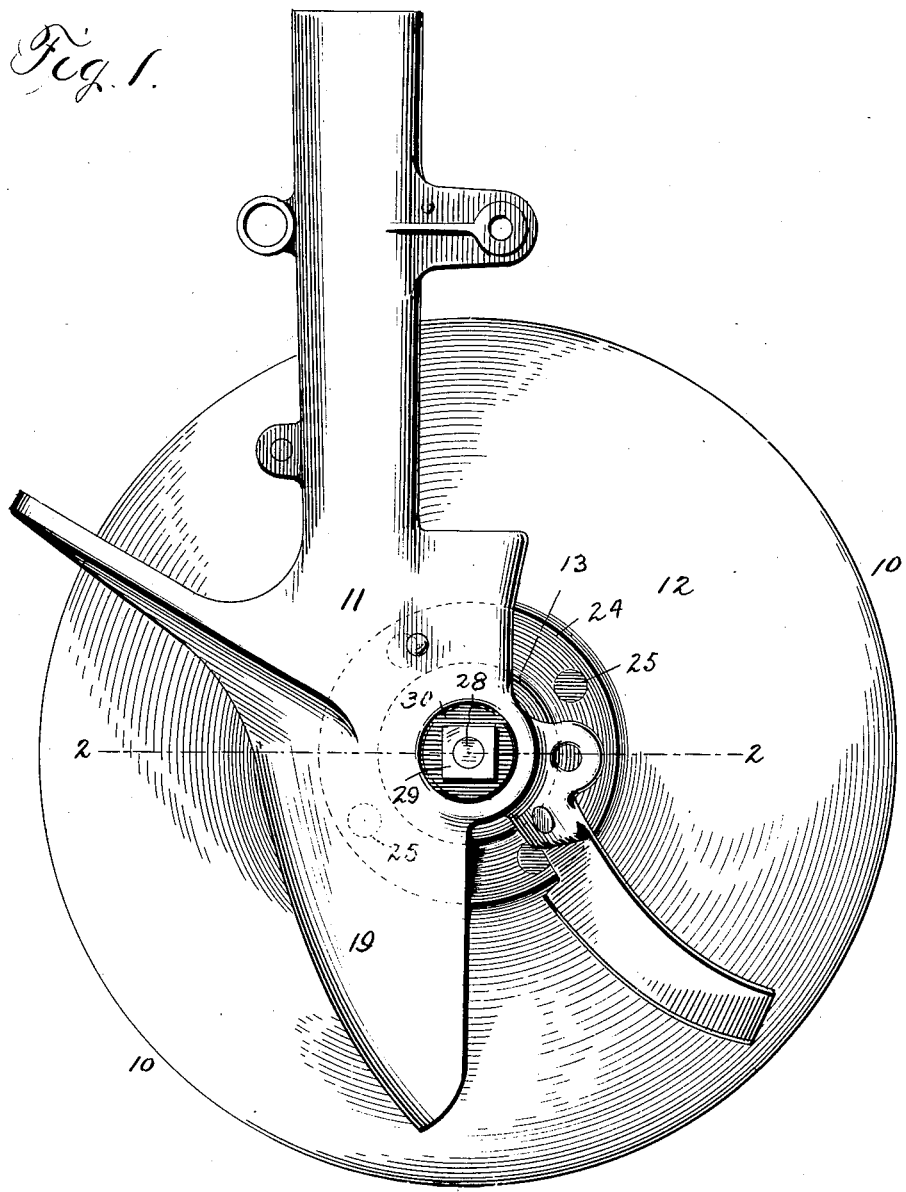

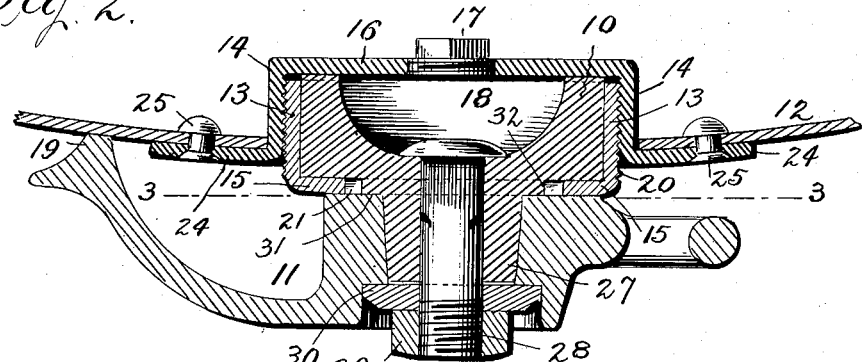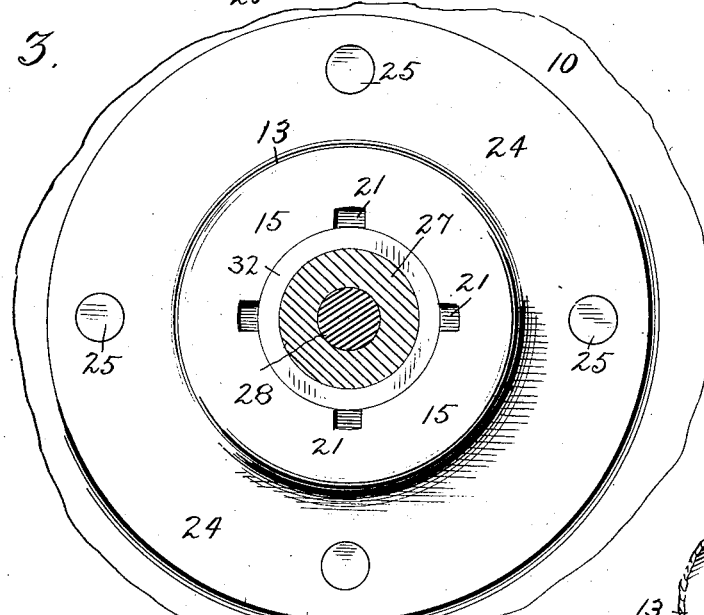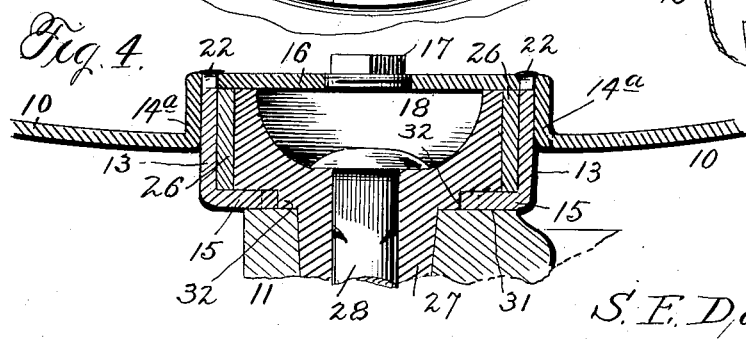

SPENCER E. DAVIS, OF MINNEAPOLIS, MINNESOTA, AND HARRISON B. BOZARD, OF LINCOLN, NEBRASKA; SAID BOZARD ASSIGNOR OF ONE-HALF OF HIS RIGHT TO MONITOR DRILL CO., OF MINNEAPOLIS, MINNESOTA.

BEARING FOR GRAIN-DRILLS, &c.

934,291.

Specification of Letters Patent.  Patented Sept. 14, 1909.

Application filed August 27, 1908. Serial No. 450,539.

*To all whom it may concern:*

Be it known that we, SPENCER E. DAVIS and HARRISON B. BOZARD, citizens of the United States, residing, respectively, at Minneapolis, in the county of Hennepin and State of Minnesota, and Lincoln, in the county of Lancaster and State of Nebraska, have invented certain new and useful Improvements in Bearings for Grain-Drills, &c., and do hereby declare that the following is a full, clear, and exact description of the same, reference being had to the annexed drawings, making a part of this specification, and to the figures of reference marked thereon.

As is well known, the conditions under which the bearings for grain drills, corn planters, and other agricultural machinery, having disks or revolving devices for opening a furrow, or for pulverizing purposes, operate, are extremely severe both on account of the great strains to which the parts are necessarily subjected by reason of the manner of mounting or supporting them, and because of the dirt in which such machinery operates, which, finding its way into the bearings, rapidly cuts and destroys them.

The object of our invention is to produce a bearing by which will be eliminated the unbalanced strains that have characterized such bearings heretofore, thereby eliminating the wear due to that condition, which will be so constructed as to resist wear for a prolonged period, and which will be practically dust-proof, as far as access of dirt or grit to the bearing surfaces is concerned, so as to obviate the wear or cutting of parts by the direct action of the grit, as well as, in consequence of or in conjunction with, conditions of unbalanced strains or pressures. We attain these objects, as well as the production of a bearing that may be perfectly lubricated and is extremely simple by the bearing constructed substantially as hereinafter specified and claimed.

We illustrate our invention as adapted to and embodied in a grain drill, but of course by selecting the grain drill to illustrate our invention, we do not thereby restrict ourselves to our invention only when embodied in grain drills.

In the accompanying drawings, Figure 1 is a side elevation of a grain drill disk and a boot having a bearing constructed in accordance with our invention, looking at the convex side of the disk; Fig. 2 a horizontal section on the line 2—2 of Fig. 1; Fig. 3 a horizontal section on the line 3—3 of Fig. 2; Fig. 4 a view similar to Fig. 2, illustrating a somewhat different embodiment of our invention; and Fig. 5 a detail view in perspective illustrating the manner of uniting the cups forming the box by riveting.

To the extent that our bearing consists of a journal or hub 10 that is supported by a boot 11, and a box on the concavo-convex disk 12, by which the disk is revolubly mounted upon the journal or hub, our bearing is similar to those that are old. We make the peripheral or circumferential bearing surface of the journal or hub perfectly cylindrical instead of inclined or conical as has been the case heretofore, and the bearing surface which it engages on the box is likewise cylindrical, and such bearing surface on the box is on a ring or sleeve 13 that fits within a ring 14 attached to the disk 12. The box-forming ring 13 is extended beyond the convex side of the disk 12 where it has an inwardly turned flange 15 which overlaps and engages the adjacent flat side of the journal or hub, while the box-forming ring 14 is extended on the concave side of the disk, and has a closed head or end 16 against which the other flat side of the journal or hub bears, and centrally in said head or end is provided an opening closed by a screw plug 17 for the introduction of a lubricant into a lubricant chamber or cavity 18, provided, as is customary, in the side of the journal or hub. It will be observed that by extending the box or the disk-bearing member on both sides of the disk, so that a portion of the journal or hub is on the convex side of the disk and a portion on the concave side, those portions being preferably equal or substantially equal, (Fig. 4 showing them equal and Fig. 2 not quite equal) will secure the important advantage of a balanced bearing for the disk, thereby eliminating the great strains that are caused when the bearing is, as is the case in prior constructions, wholly or substantially wholly on one side of the disk. Besides the avoidance of undue strains and consequent tendencies to wear by arranging portions of the bearing on both sides of the disk, another important advantage secured is the prevention of such pressure against the edge of the usual shield 19 on the boot by the convex side of the disk. With the disk so supported by its bearing that it may have a lateral or sidewise movement toward the shield, the great friction of the disk on the shield wears or cuts the edge of the shield away, producing an opening or space between the edge of the shield and the disk in which grass and weeds may lodge, and thereby preventing the seed from dropping to the bottom of the furrow and resulting in its being scattered on the top of the soil. With our bearing the disk is so rigidly supported that it is impossible for it to have lateral or sidewise movement or play enough to cause any wear of the shield so that the seed is delivered uniformly to the bottom of the seed bed opened by the disk and shield.

The contacting surfaces of the journal or hub, and the box-forming members, are so formed, and the parts are so assembled that such surfaces are held with sufficient tightness or closeness together as to be dust-proof, and yet enable the lubricant to find its way between the abutting surfaces of the journal or hub and the end wall 16 of the box member and between the peripheries of the hub and the ring or sleeve 13 and the side of the hub and the flange 15. The fit is so close that in actual use if there be no lubricant in the lubricant chamber, after a few revolutions of the disk the friction of the parts will produce sufficient heat and expansion as to cause the disk to become set or locked so that it will no longer revolve, and this behavior of the bearing has the important advantage that it compels the applying of the lubricant in order to enable the drill to be used, and by preventing its use without a lubricant prevents the cutting or wear of the parts that would occur were the bearing used without any lubricant. With the lubricant present in the bearing, the heat generated by the friction is sufficient to produce such a state of fluidity of the lubricant as to enable it to readily pass over the surfaces hereinbefore referred to, which is necessary for the proper lubrication of the bearing, and this state of fluidity and this operation or action of the lubricant takes place before the parts of the bearing can be sufficiently heated to cause them to be set or locked.

In order to secure the tight side contact of the journal or hub and the boxes above described, and also to enable compensation or take up for wear, we preferably screw the bearing ring or sleeve 13 into the disk-carrying ring 14, cutting thread 20 on the external periphery of the ring or sleeve 13, and corresponding thread on the internal periphery of the ring 14, and provide in the flange 15 of the ring or sleeve 13 notches 21 for engagement by a spanner wrench for turning the ring or sleeve 13. However, as illustrated in Fig. 4, the two box-forming rings may be fixedly and permanently united by riveting, lugs 22 being provided on the edge of the ring or sleeve 13 which project through slots or holes 23 in the end or head 16 of the ring 14, and upset or headed down on the outside thereof.

In the embodiment of our invention illustrated in Figs. 1, 2 and 3, the box-forming ring 14 is made separate from the disk 10 and the two are joined together by means of an outwardly extending flange or rim 24 on the ring 14, which overlaps the convex side of the disk, and the two are united by rivets 25. It will be evident that by locating the flange or rim 24 on the convex side of the disk, there will be no tendency to tear or pull apart the ring and the disk in consequence of the great pressure or strains on the disk, because the latter are against the concave side thereof, so that the disk is pressed against the flange all the more firmly or tightly by reason of the pressures or strains developed in the operation of the machine. However, we contemplate forming the disk bearing member 14 integrally with the disk instead of separate therefrom and attached to it as we have just described, and we illustrate such a construction in Fig. 4. In this case the disk box-bearing member 14ᵃ is formed by drawing or pressing it from the stock from which the disk is made.

An important factor contributing to the enduring or lasting character of our bearing, so that it may be termed an indestructible bearing, is the use of hardened metal in making the box-bearing members as well as the hub or journal. We preferably use case hardened steel, but if desired chilled iron may be used, and when we use the term "hardened metal" we mean metal hardened as by the case-hardening of steel or the chilling of iron When we make the disk-carrying box member integral with the disk, as illustrated in Fig. 4, we make it of chilled iron, and in order to provide the hardened metal bearing for the hub or journal in the construction illustrated in Fig. 4, wherein the ring or sleeve 13 is riveted to the ring (the use of riveting precluding the employment of hardened metal) we interpose between the hub or journal and the ring 13, a hardened metal bearing ring 26.

For attaching our bearing to the boot 11, a tapering stud 27, on the side of the hub or journal on the convex side of the disk, is inserted in a similar opening in the boot, and the parts are clamped or held together by a bolt 28 secured to the hub or journal with its threaded end projecting beyond the stud to receive a clamping nut 29 that bears against a washer 30 engaging the bottom of an annular cavity in the outer side of the boot. We utilize the boot to protect the joints of the bearing from the access of grit or dust thereto, by providing on the boot a flat surface 31 which overlies the outer side surfaces of the ring flange 15 and the journal or hub where the latter passes through said flange, and the journal or hub at this point is provided with an annular shoulder or collar 32 that closely fits the inner circumference or periphery of the ring flange 15, so that a joint is formed at this place adding to the difficulty of access of dust to the interior of the bearing.

It will be observed that the bolt 28 is not screwed into the hub or journal, but the head of the bolt is within the lubricant chamber so that the thread projects beyond the hub or journal to receive a clamping nut. A screw connection between the bolt and the hub or journal is objectionable, because since in a chilling operation, for example, if a thread be used in the hub or journal, the thread will shrink unequally, so that when the bolt is screwed therein, it will strip them.

It will be observed that all of the parts of our bearing that are at all exposed to dirt and dust, are on the convex side of the disk, and we have constructed our bearing to secure this position, because there is at least four times as much dirt thrown against the concave side of the disk as against the convex side. It will also be observed that as the superior pressure on the disk is on the concave side, the effect of the pressure upon the bearing is to press all the more close together the plane side surfaces that are in contact.

It will be noted that the two members of the box are cup-shape, and as we prefer to make them, we draw them out of steel.

We prefer in embodying our invention to combine in a single bearing all the features of the balanced position of the bearing with reference to the disk, the cylindrical contact surfaces between the hub and the box, the hard metal bearing surfaces for all the wearing parts, and the construction and arrangement of parts for excluding dust, but we desire it understood that a bearing using any one or some, but not all, of these features of our invention, is regarded by us as embodying our invention, and therefore in the scope of our patent.

Having thus described our invention, what we claim is—

1. The combination of a disk, a journal having a cylindrical bearing surface, and a box composed of two cup-shape members, each having an integral annular flange, the flange of one being overlapped by the flange of the other, the disk being directly supported from the inner end of the outer or overlapping flange, and the journal being inclosed by said members, and its opposite sides being engaged by the end portions thereof.

2. The combination of a disk, a journal having a cylindrical bearing surface, and a box composed of two cup-shape members, each having an integral annular flange, the flange of one being overlapped by and screwed into the flange of the other, the disk being directly supported from the inner end of the outer or overlapping flange, and the journal being inclosed by said members, and its opposite sides being engaged by the end portions thereof.

3. The combination of a disk, a journal having a cylindrical bearing surface, and a box composed of two cup-shape members, each having an integral annular flange, the flange of one being overlapped by the flange of the other, the disk being directly supported from the inner end of the outer or overlapping flange, and the journal being inclosed by said members, and its opposite sides being engaged by the end portions thereof, and the journal having a lubricant chamber closed by the end wall of the outer cup-shape member.

In testimony whereof we affix our signatures in presence of two witnesses.

SPENCER E. DAVIS.
HARRISON B. BOZARD.

Witnesses:
 WILL L. WARNER,
 H. G. FREEMAN.